United States Patent
Dice et al.

(10) Patent No.: US 12,045,670 B2
(45) Date of Patent: Jul. 23, 2024

(54) COMPACT SYNCHRONIZATION IN MANAGED RUNTIMES

(71) Applicant: Oracle International Corporation, Redwood City, CA (US)

(72) Inventors: David Dice, Foxboro, MA (US); Alex Kogan, Needham, MA (US)

(73) Assignee: Oracle International Corporation, Redwood City, CA (US)

( * ) Notice: Subject to any disclaimer, the term of this patent is extended or adjusted under 35 U.S.C. 154(b) by 567 days.

(21) Appl. No.: 17/245,820

(22) Filed: Apr. 30, 2021

(65) Prior Publication Data

US 2022/0138022 A1    May 5, 2022

Related U.S. Application Data

(60) Provisional application No. 63/108,156, filed on Oct. 30, 2020.

(51) Int. Cl.
  *G06F 9/52*   (2006.01)
  *G06F 9/30*   (2018.01)
  *G06F 9/50*   (2006.01)
  *G06F 9/54*   (2006.01)

(52) U.S. Cl.
  CPC .......... *G06F 9/526* (2013.01); *G06F 9/30087* (2013.01); *G06F 9/5016* (2013.01); *G06F 9/541* (2013.01); *G06F 9/542* (2013.01)

(58) Field of Classification Search
  CPC .... G06F 9/526; G06F 9/30087; G06F 9/5016; G06F 9/541; G06F 9/542; G06F 9/52
  See application file for complete search history.

(56) References Cited

U.S. PATENT DOCUMENTS

| | | |
|---|---|---|
| 6,965,961 B1 | 11/2005 | Scott |
| 8,458,721 B2 | 6/2013 | Marathe et al. |
| 8,694,706 B2 | 4/2014 | Dice et al. |

(Continued)

OTHER PUBLICATIONS

E. W. Dijkstra, "Solution of a Problem in Concurrent Programming Control", In Communications of the ACM, vol. 8, No. 9, Sep. 1965, p. 569.

(Continued)

*Primary Examiner* — Kenneth Tang
(74) *Attorney, Agent, or Firm* — Robert C. Kowert; Kowert, Hood, Munyon, Rankin & Goetzel, P.C.

(57) ABSTRACT

A computer including multiple processors and memory implements a managed runtime providing a synchronization application programming interface (API) for threads that perform synchronized accesses to shared objects. A standardized header of objects includes a memory word storing an object identifier. To lock the object for synchronized access, the memory word may be converted to store the tail of a linked list of a first-in-first-out synchronization structures for threads waiting to acquire the lock, with the object identifier relocated to the list structure. The list structure may further include a stack of threads waiting on events related to the object, with the synchronization API additionally providing wait, notify and related synchronization operations. Upon determining that no threads hold or desire to hold the lock for the object and that no threads are waiting on events related to the object, the memory word may be restored to contain the object identifier.

20 Claims, 10 Drawing Sheets

(56) References Cited

U.S. PATENT DOCUMENTS

| | | | |
|---|---|---|---|
| 8,966,491 B2 | 2/2015 | Calciu et al. | |
| 10,949,264 B2 | 3/2021 | Kogan et al. | |
| 2015/0286586 A1* | 10/2015 | Yadav | G06F 9/526 |
| | | | 711/152 |
| 2016/0378382 A1* | 12/2016 | Busaba | G06F 3/0622 |
| | | | 711/150 |
| 2020/0034212 A1* | 1/2020 | Shveidel | G06F 9/52 |
| 2020/0097335 A1 | 3/2020 | Kogan et al. | |

OTHER PUBLICATIONS

John M. Mello-Crummey, et al., Algorithms for Scalable Synchronization on Shared-Memory Multiprocessors, Appeared in ACM Transaction on Computer Systems, Jan. 1991, pp. 1-42.
Dave Dice, et al., "Flat-Combining NUMA Locks", ACM, SPAA'11, Jun. 4-6, 2011, pp. 65-74.
Milind Chabbi, et al., "High Performance Locks for Multi-level NUMA Systems", ACM, PPoPP'15, Feb. 7-11, 2015, pp. 215-226.
David Dice, et al., "Lock Cohorting: A General Technique for Designing NUMA Locks", ACM, PPoPP'12, Feb. 25-29, 2012, pp. 1-10.
U.S. Appl. No. 17/200,610, filed Mar. 12, 2021, Alex Kogan, et al.

* cited by examiner

| syncNode structure 600 | |
|---|---|
| state | 610 |
| next | 620 |
| waitSet | 630 |
| DMW | 640 |
| nest | 650 |
| object reference | 660 |

*FIG. 6*

| syncNode states 700 | |
|---|---|
| undefined | 710 |
| free | 720 |
| wait | 730 |
| special | 740 |
| entry | 750 |
| locked | 760 |

*FIG. 7*

COMPACT SYNCHRONIZATION IN MANAGED RUNTIMES

This application claims benefit of priority to U.S. Provisional Application Ser. No. 63/108,156, entitled "Compact Synchronization in Managed Runtimes," filed Oct. 30, 2020, and which is incorporated herein by reference in its entirety.

BACKGROUND

Field of the Disclosure

This disclosure relates generally to concurrent programming, and more particularly to systems and methods for performing concurrent synchronization in a managed runtime.

Description of the Related Art

Modern computer systems conventionally include the ability to execute applications within a managed environment that includes management and protection of memory resources. These systems also include the ability to use multiple parallel threads of execution across multiple processors, giving rise to a need to provide synchronization for shared access to these objects. Such synchronization often requires additional memory devoted to synchronization operations, yet adding such memory to objects is in direct conflict with an inherent goal to keep memory overhead for objects to a minimum.

To address these concerns, approaches have been developed that allow memory dedicated to object management to be dynamically expanded as needed to support synchronization operations, but these approaches introduced additional performance issues. Prior to memory expansion, memory usage remains minimal, but as individual objects encounter access contention, memory footprint grows and additional schemes to reduce memory growth come with their own penalties in performance, scalability, complexity and synchronization. What is needed is a dynamic memory growth solution that provides additional synchronization structures to objects under access contention while providing low latency during periods of little or no contention, while limiting memory growth, complexity and performance impact to the managed environment.

SUMMARY

Methods, techniques and systems for implementing synchronization operations in a managed runtime are described. These various embodiments provide a synchronization application programming interface (API) for threads that perform synchronized accesses to shared objects. Using an approach similar to locking techniques such as the Mellor-Crummey and Scott, or MCS, lock and possessing similar benefits, this synchronization API moves all synchronization data that might otherwise be associated with the object into synchronization nodes associated with the threads themselves. To lock the object for synchronized access, a memory word within the header of an object may be repurposed to store the tail of a linked list of a first-in-first-out (FIFO) queue synchronization structures for threads waiting to acquire the lock, with the contents of the memory word relocated to the list structure. The list structure may further include a stack of threads waiting on events related to the object, with the synchronization API additionally providing wait, notify and related synchronization operations. Upon determining that no threads hold or desire to hold the lock for the object and that no threads are waiting on events related to the object, the memory word may be restored with its original data.

BRIEF DESCRIPTION OF THE DRAWINGS

FIG. 6 is a diagram illustrating a syncNode structure used in various embodiments.

FIG. 7 is a diagram illustrating various synchronization state values used in various embodiments.

Figure 1:
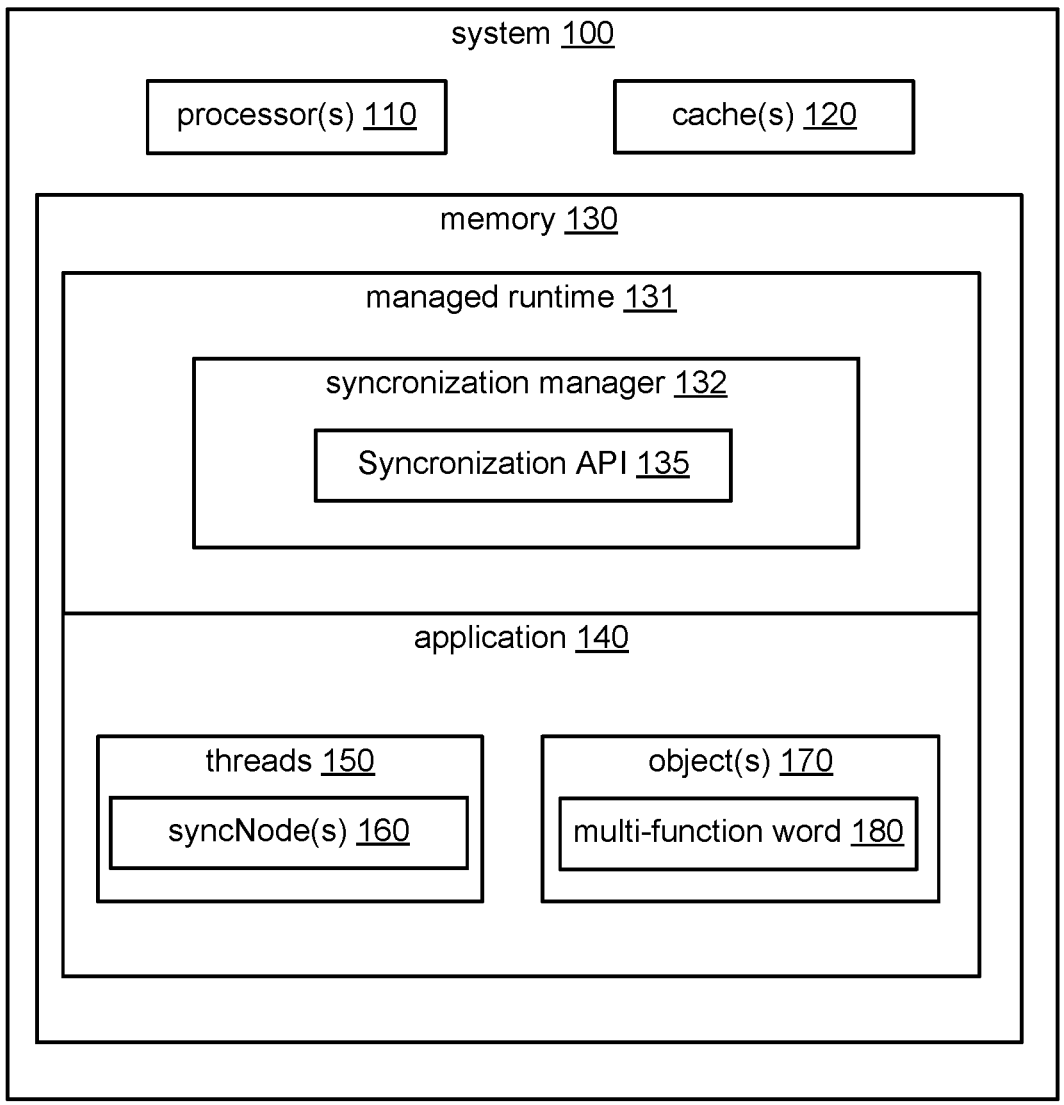
FIG. 1 is a block diagram illustrating a system implementing a managed runtime for an application implementing multiple threads sharing objects through the use of a synchronization application programming interface (API).

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Modern computer systems conventionally include the ability to execute applications within a managed environment that includes management and protection of memory resources. In a managed environment, applications make use of memory by creating objects where individual objects have memory used by the managed environment in addition to memory used by the application itself. Because the number of objects within an application can be large, it is critical that object memory dedicated to management be as small as possible.

These systems also include the ability to use multiple parallel threads of execution across multiple processors, giving rise to a need to provide synchronization for shared access to these objects. Such synchronization often requires additional memory devoted to synchronization operations, yet adding such memory to objects is in direct conflict with an inherent goal to keep memory overhead for objects to a minimum.

Various embodiments for providing a synchronization application programming interfaces (API) and associated data structures for managed runtimes are disclosed. These synchronization APIs may provide synchronization operations to a multi-threaded application for accessing shared objects and provide simultaneous benefits of low latency and zero memory growth during non-contention conditions with minimal memory footprint and zero object memory growth during contention through the use of linked lists and distributed per-thread data structure using an approach similar to locking techniques such as the Mellor-Crummey and Scott, or MCS, lock. Upon resolution of contention conditions, these embodiments naturally provide restoration of the original state of synchronized object, eliminating the need for background recovery or garbage collection requirements, thus further improving performance and scalability of managed runtimes.

FIG. 1 is a block diagram illustrating a system implementing a managed runtime, such as a JVM, for an application sharing objects with the use of a synchronization application programming interface (API). A system 100 includes one or more processors 110 capable of executing multiple parallel threads of execution coupled through one or more caches 120 to a memory 130 that includes an application 140 executing in coordination with a managed runtime 131. The application 140 may include multiple executing threads 150 that access objects 170 for which synchronized access may be needed. To provide object synchronization, the managed runtime 131 may provide a synchronization manager 132 that includes a synchronization application programming interface (API) 135. Such a synchronization API may provide a number of synchronization operations such as discussed below regarding FIG. 4.

Each of the threads 150 needing synchronized access to objects 170 may use one or more syncNodes 160. Details of these syncNodes are discussed further below regarding FIG. 6 and usage of these syncNodes is detailed further in FIGS. 8-13. Individual objects 170 include data described further in FIG. 2 including a multi-function word 180. The synchronization API 135 may use the multi-function word 180 of an object in combination with syncNodes of individual threads 150 to provide synchronization services for the application 140.

Figure 2:
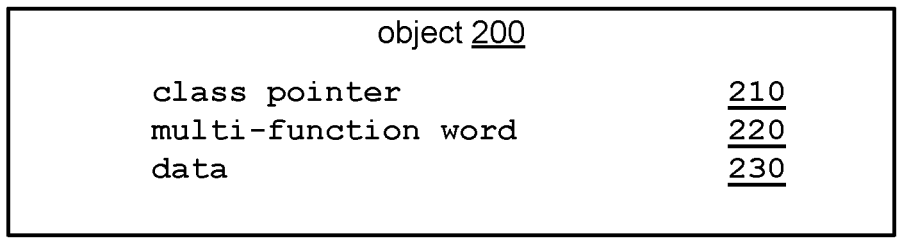
FIG. 2 is a diagram illustrating an object data structure used in various embodiments.

FIG. 2 is a diagram illustrating an object data structure used in various embodiments. A managed runtime, such as a JVM, may implement objects 200 to store data for an application, such as the application 140 as shown in FIG. 1. The objects 200 may include data specific to the object as specified by the application, shown as data 230. In addition, objects may include additional data not available for use by the application but available for use by the managed runtime, such as the managed runtime 131 as shown in FIG. 1.

Included in this additional data is an identifier of the type of object, shown as the class pointer 210, which may identify the type of object, the specific layout of the data 230, and, in some embodiments, particular methods for accessing the object. Also included in the additional data is a multi-function word 220 which may be used by the managed runtime for multiple purposes. The multi-function word 220 is described in further detail below in FIGS. 3 and 7. Other fields of object 200 may also be employed in various embodiments and it should be understood that the fields described above are not intended to be limiting.

Figure 3:
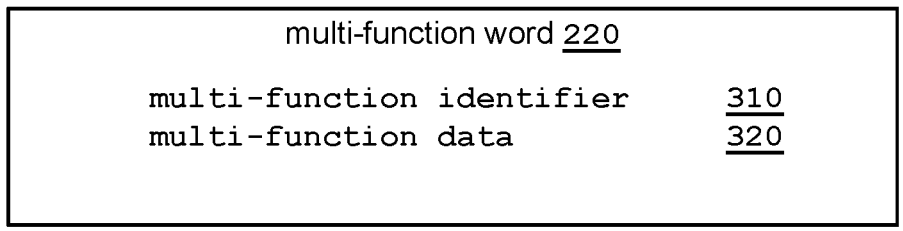
FIG. 3 is a diagram illustrating a multi-function word data structure used in various embodiments.

FIG. 3 is a diagram illustrating a multi-function word data structure used in various embodiments. A multi-function word, such as the multi-function word 220 as shown in FIG. 2, may include multi-function data 320 as well as a multi-function identifier 310 which may identify the type of data stored in the multi-function data 320, according to some embodiments. Examples of multi-function identifier values are given below in FIG. 7.

Figure 4:
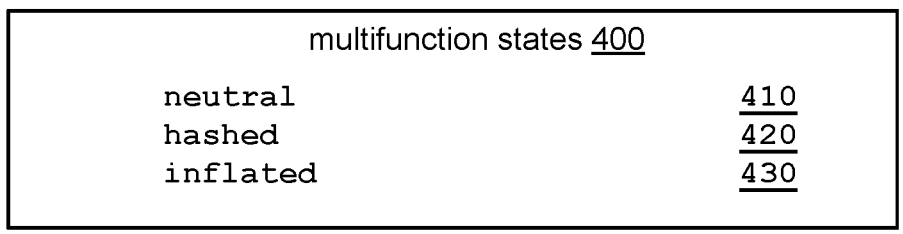
FIG. 4 is a diagram illustrating various multi-function state values used in various embodiments.

FIG. 4 is a diagram illustrating various multi-function state values 400 used in various embodiments. In some embodiments, the multi-function word, such as the multi-function word 220 of object 200 shown in FIG. 2, may have a neutral state 410 indicating that the multi-function word contains no value or an undefined value. In some embodiments, the multi-function word may have a hashed state 420 indicating that the multi-function word contains a hashcode value usable to identify the object. In some embodiments, the multi-function word may have an inflated state 430 indicating that the multi-function word contains the tail pointer for a first-in-first-out (FIFO) queue of syncNode structures, such as the syncNode(s) 160 as shown in FIG. 1, identifying a list of threads waiting to acquire a synchronization lock for the object. Other multi-function state values may also be employed in various embodiments and it should be understood that the states described above are not intended to be limiting.

Figure 5:
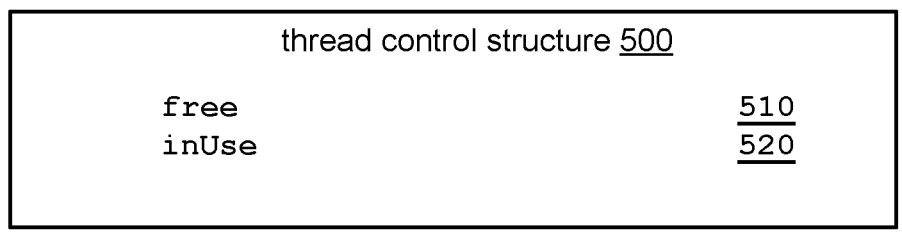
FIG. 5 is a diagram illustrating a thread data structure used in various embodiments.

FIG. 5 is a diagram illustrating a thread data structure used in various embodiments. In some embodiments, a thread, such as the threads 150 as shown in FIG. 1, may have a thread control structure 500 which may include a free field 510 which points to a linked list of free syncNode structures, such as the syncNode(s) 160 as shown in FIG. 1. Maintaining a list of free syncNodes may enable a managed runtime to reduce latency associated with the allocating and freeing of syncNode structures as part of synchronization operation, in some embodiments.

The control structure 500 may also include an inUse field 520 in some embodiments which may be used to track syncNodes currently active in various object synchronization operations. Other fields of the thread control structure 500 may also be employed in various embodiments and it should be understood that the fields described above are not intended to be limiting.

FIG. 6 is a diagram illustrating a synchronization, or syncNode, structure used in various embodiments. In some embodiments, a syncNode structure, such as the syncNode(s) 160 as shown in FIG. 1, may include a state field 610 to indicate the state of the syncNode structure. Example states of the state field are further disclosed below in FIG. 7.

The syncNode structure may also include a next pointer 620 to form a linked list of syncNodes. This linked list may form, for example, a FIFO list of syncNodes waiting to hold a lock for an object or may form a stack of syncNodes, for example a stack of free syncNodes or stack of waiting syncNodes depending on the state of the syncNode structure, in some embodiments.

The syncNode structure may include a waitSet pointer 630 that points to a first syncNode of a linked list of syncNodes waiting on events associated with an object. This linked list may implement a FIFO list, a stack or a last-in-first-out (LIFO) list of syncNodes. Other forms of waitSet lists may also be employed in various embodiments and it should be understood that the fields described above are not intended to be limiting.

The syncNode structure may further include a Displaced Multi-function Word (DMW) field 640 which may contain the value of a displaced hashcode for the object when the object multi-function word indicates an inflated state, such as indicated by the inflated state 430 as shown in FIG. 4, in some embodiments.

In some embodiments, lexically paired locks may be supported through the use of a nest field 650 as further described below in FIGS. 8 and 9. The syncNode structure may, in some embodiments, further include an object reference field 660 which may serve to link the syncNode to its corresponding object. Other fields of the syncNode structure 600 may also be employed in various embodiments and it should be understood that the fields described above are not intended to be limiting.

The syncNode structure may further include an object reference field 660 which may contain a reference to the associated object, in some embodiments. The object reference field 660 may be usable to identify a syncNode currently active for a particular object, in some embodiments.

FIG. 7 is a diagram illustrating various synchronization state values 700 used in various embodiments. In some embodiments, a syncNode may have an undefined state 710 indicating that the syncNode state is unknown. In some embodiments, a syncNode may have a free state 720 indicating that the syncNode is not current associated with any object. In some embodiments, a syncNode may have a wait state 730 indicating that the syncNode waiting on an event associated with an object.

In some embodiments, a syncNode may have a special state 740 indicating that the syncNode resides as a placeholder at the tail of an object's synchronization queue in the multi-function word of the object. The syncNode special state is discussed in further detail below in FIGS. 8-11. In some embodiments, a syncNode may have a locked state 760 indicating that the thread associated with the syncNode currently holds the lock for the associated object. Other multi-function state values may also be employed in various embodiments and it should be understood that the states described above are not intended to be limiting.

Figure 8:
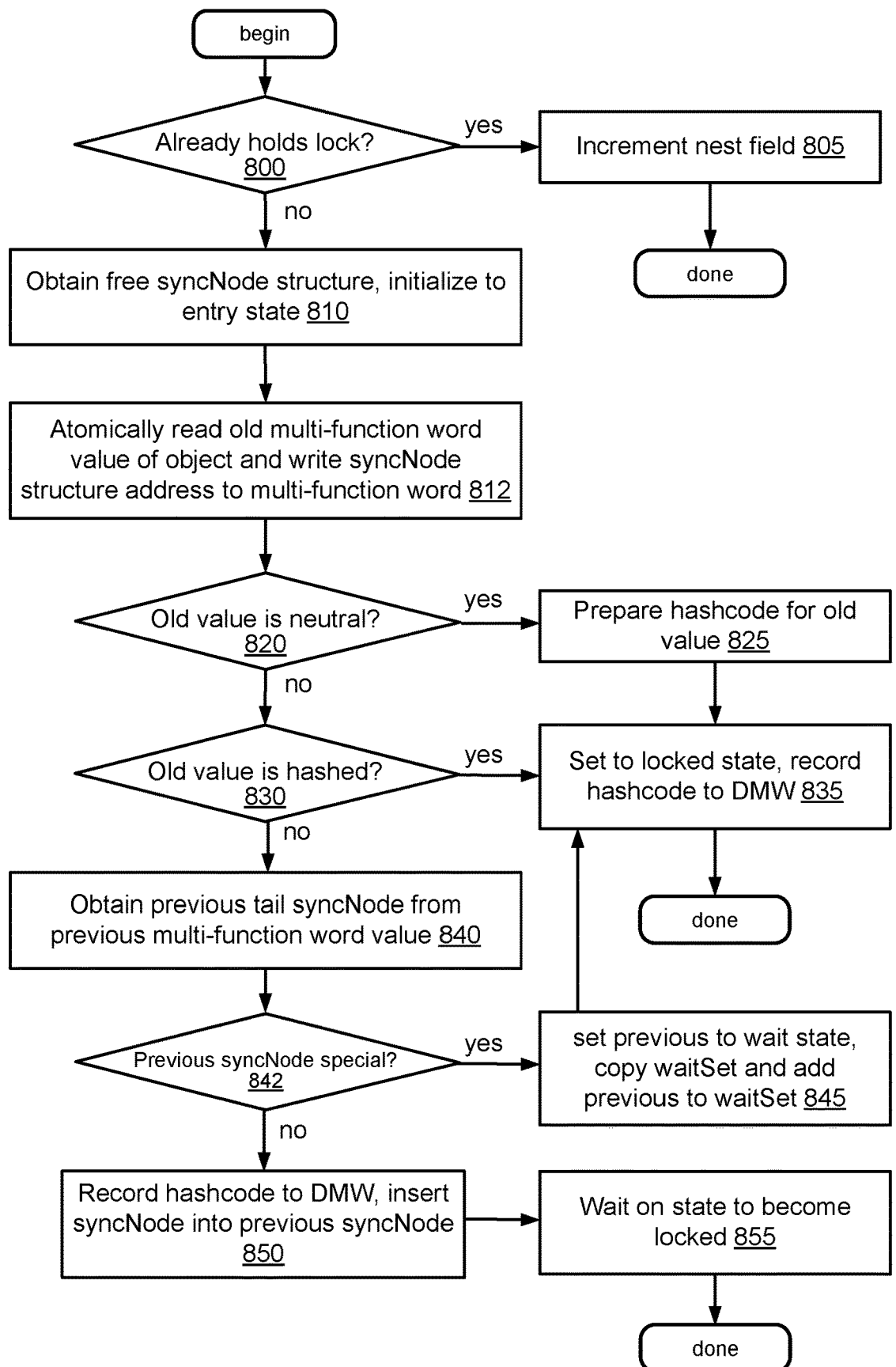
FIG. 8 is a flow diagram illustrating an embodiment of a method for assuming control of a lock of an object.

FIG. 8 is a flow diagram illustrating some embodiments of a method for assuming control of a lock of an object. The method begins with a thread determining if it already holds the lock for an object as shown in 800. In some embodiments, a thread may make this determination by accessing a linked list of inUse syncNodes, for example using the inUse field 520 of its thread control structure 500 as shown in FIG. 5, to identify the syncNode associated with the object. If a syncNode in its inUse linked list is associated with the object, as identified by the object reference field 660 of the syncNode structure 600 as shown in FIG. 6 then, in some embodiments, a determination that the lock is held by the thread may be made. If the lock is currently held, a nest field, such as the nest field 650 of FIG. 6, may be incremented to supported nested, lexically balanced locking if provided by the managed runtime. If the lock is determined to not be held by the thread, the method proceeds to step 810.

As shown in 810, the thread may then obtain a free syncNode structure to obtain a hold on the object lock. In some embodiments, the thread may obtain a free syncNode from a stack of free nodes pointed to by the free field 510 of the thread control structure 500 as shown in FIG. 5. If no free syncNode structure exists, syncNode structure(s) may be allocated in memory and added to the free list or allocated directly by the thread. In other embodiments, other allocation schemes may be employed and it should be understood that the allocation methods described above are not intended to be limiting.

Once allocated, the syncNode may be initialized and atomically added to the tail of a linked list FIFO of syncNodes waiting to hold the lock of the object, as shown in step 812. In some embodiments, this adding may be performed using an atomic operation, such as an atomic Swap operation or an atomic Compare And Swap (CAS) operation, modifying the multi-function word of the object. Once installed, the previous value of the multi-function word may be one of numerous values as defined by the multi-function identifier 310 of FIG. 3. If the old value is neutral, as shown in 820, then a hashcode for the object may not yet exist and the method proceeds to step 825 where a hashcode for the object is prepared. The method may then proceed in some embodiments to step 835 where the syncNode may be set to a locked state and the hashcode may be stored in the DMW field 640 as shown in FIG. 6.

If the old value is hashed, as shown in step 830, the method proceeds to step 835 where the syncNode may be set to a locked state and the hashcode may be stored in the DMW field 640 as shown in FIG. 6.

If the old value is neither neutral nor hashed, then the syncNode has been added to the end of a FIFO list of syncNode structures waiting to hold the lock of the object. The method then proceeds to step 840 where the syncNode of the previous tail of the FIFO list may be derived from the value returned from the executed atomic operation in 812, in some embodiments. As shown in 842, if the previous syncNode structure is indicated as being in a special state, as indicated by a special state value 740 as shown in FIG. 7, then the method proceeds to step 845 where the previous syncNode may be set to a wait state, as indicated by setting the state field 610 to a wait state 730 as indicated in FIGS. 6 and 7, the waitSet of the object may be copied to the waitSet 630 of the SyncNode and the previous syncNode may be added to the waitSet, for example, by pushing the previous node onto the waitSet stack in some embodiments. The method proceeds to step 835 where the syncNode may be set to a locked state and the hashcode may be stored in the DMW field 640 as shown in FIG. 6.

If the previous syncNode is not set to a special state, the method proceeds to step 850 where the method may record the hashcode by copying it from the previous syncNode to the DMW field 640 of the syncNode. An address of the syncNode is then written to the next field 620 of the previous syncNode to form the linked list FIFO of syncNodes waiting to hold the lock of the object. The thread may then proceed to step 855 where the thread waits to for its state to be set to locked as indicated by a state 410 value of locked 760 as shown in FIGS. 6 and 7. Once the state is set to locked, the thread holds the lock and the process is complete.

Figure 9:
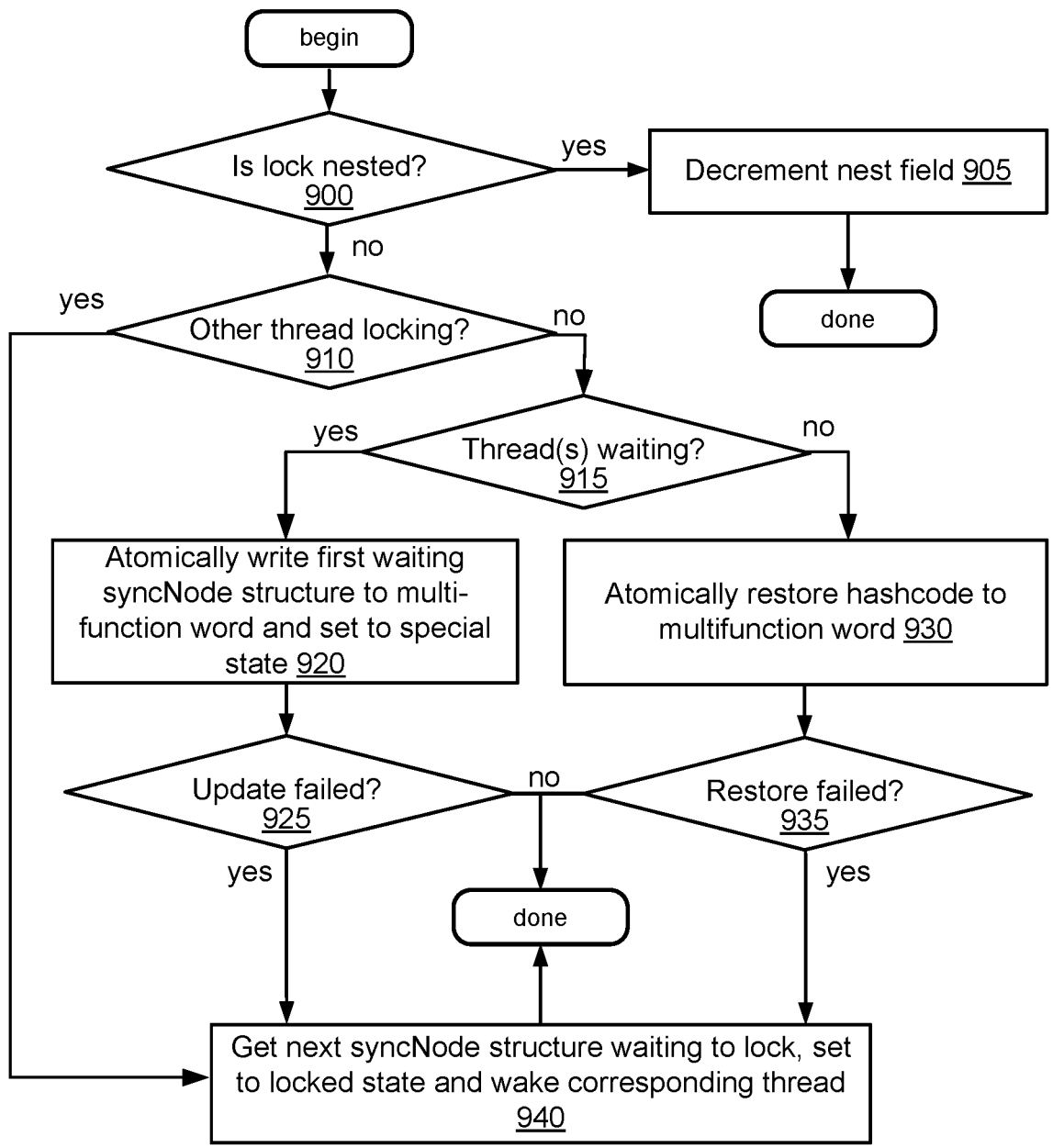
FIG. 9 is a flow diagram illustrating an embodiment of a method for releasing control of a lock of an object.

FIG. 9 is a flow diagram illustrating some embodiments of a method for releasing control of a lock of an object. The method begins with a thread determining if the lock for the object is nested, as shown in 900, if the managed runtime supports nested, lexically balanced locking. In some embodiments, a thread may make this determination by accessing a linked list of inUse syncNodes using the inUse field 520 of its thread control structure 500, as shown in FIG. 5, in combination with object reference field 660 as shown in FIG. 6, to identify the syncNode associated with the object. If a nest count, such as the nest field 650 of FIG. 6, is greater than zero, a determination is made that the lock is nested. If the lock is nested, the method proceeds to step 905 where the nest count may be decremented and the method is complete. Otherwise, the process proceeds to step 910. In other embodiments, other nest count schemes may be employed and it should be understood that the nest tracking method described above is not intended to be limiting.

As shown in step 910, the method next determines if another thread is waiting to hold the lock as indicated by a syncNode identified in the FIFO linked list using, for example, the next field 620 of the syncNode structure 600 as shown in FIG. 6. If another thread is waiting to hold the lock, the method proceeds to step 940 where control of the lock may be passed in some embodiments the to the next waiting thread by setting the next syncNode to a locked state and waking the next waiting thread. The process is then complete.

If no other threads are waiting to hold the lock, the method then proceeds to step 915 where the thread determines if threads are waiting on events associated with the object. In some embodiments, the thread may make the determination by accessing a waitSet, such as the waitSet 630 of the syncNode structure 600 as shown in FIG. 6. If no threads are waiting on events associated with the object, then the method proceeds to step 930 where the hashcode of the object may be returned to the multi-function word of the object. In some embodiments, the thread may restore the hashcode using an atomic CAS instruction. If the atomic CAS instruction succeeds as shown in 935, the process is complete. If the CAS instruction fails, then a new syncNode has been added by another thread prior to execution of the CAS instruction, the new syncNode representing the other thread waiting to hold the lock. The method proceeds to step 940 where control of the lock is passed to the next waiting thread by setting the next syncNode to a locked state and waking the next waiting thread. The process is then complete.

If threads are waiting on events associated with the object, the method may proceed to step 920 where the first syncNode in the waitSet is removed from the waitSet and set to a special state, for example by writing a special state 740 to the state field 610 of the syncNode structure as shown in FIGS. 6 and 7. In the special state, the syncNode continues to represent a thread waiting on an event associated with the object while anchoring the synchronization structure for the object in the absence of threads waiting to hold the lock.

The method may then update the multi-function word of the object with the syncNode in the special state, in some embodiments, using an atomic CAS instruction. If the atomic CAS instruction succeeds as shown in 925, the process is complete. If the atomic CAS instruction succeeds as shown in 935, the process is complete. If the CAS instruction fails, then a new syncNode has been added representing a new thread waiting to hold the lock. The method proceeds to step 940 where control of the lock is passed the to the next waiting thread by setting the next syncNode to a locked state and waking the next waiting thread. The process is then complete.

Figure 10:
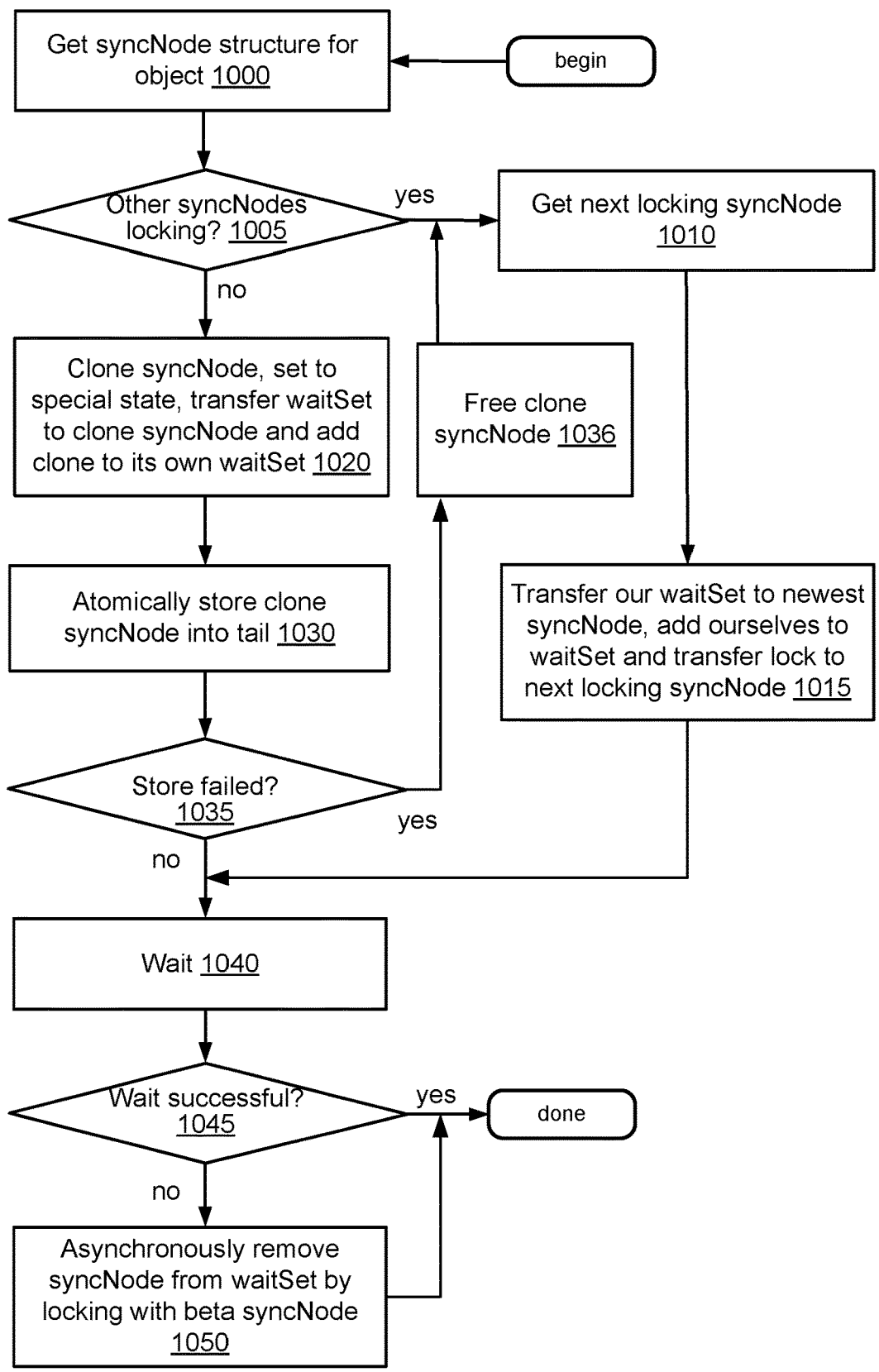
FIG. 10 is a flow diagram illustrating an embodiment of a method for waiting for an event related to an object.

FIG. 10 is a flow diagram illustrating some embodiments of a method for waiting for an event related to an object. The method begins at step 1000 by accessing a linked list of inUse syncNodes using the inUse field 520 of its thread control structure 500 as shown in FIG. 5 to identify a current syncNode associated with the object, in some embodiments. The method then proceeds to step 1005 where it may be determined if there are other syncNodes are waiting to hold the lock for the object.

If there are other syncNodes waiting to hold the lock, the method proceeds to step 1010 where the next syncNode in the FIFO list may be selected. Then, in step 1015, the waitSet of the current syncNode may be transferred to the next syncNode, the current syncNode added to the waitSet, and the lock transferred to the next syncNode by setting the next syncNode to a locked state, for example by writing a locked state value 760 as shown in FIG. 7 to a state field 610 of the next syncNode structure 600 as shown in FIG. 6, and waking the next syncNode, in some embodiments. Then method may then proceed to step 1040.

If, however, there are no other syncNodes waiting to hold the lock, the method proceeds to step 1020 where the current syncNode may be cloned and the cloned syncNode set to a special state. The waitSet of the current syncNode may then be transferred to the cloned syncNode and the current syncNode added to the waitSet. The cloned syncNode may then be atomically stored, in some embodiments, into tail of the FIFO list using an atomic CAS instruction to modify the multi-function word of the object, as shown in step 1030.

If the atomic CAS instruction fails, as shown in 1035, then a new syncNode has been added to the FIFO list. As such, the method may proceed to step 1036 where the clone syncNode may be freed in some embodiments. The method may then proceed to step 1010. If, however, the atomic CAS instruction succeeds, as shown in 1035, then the method may proceed to step 1040.

As shown in step 1040, the thread may then wait for an event associated with the object to occur. If the event occurs, as indicated by successful completion of the wait as shown in 1045, then the method is complete. Otherwise, the method proceeds to step 1050 where the syncNode may be asynchronously removed from the waitSet, as discussed further below in FIG. 11. Once the syncNode is asynchronously removed, the method is complete.

Figure 11:
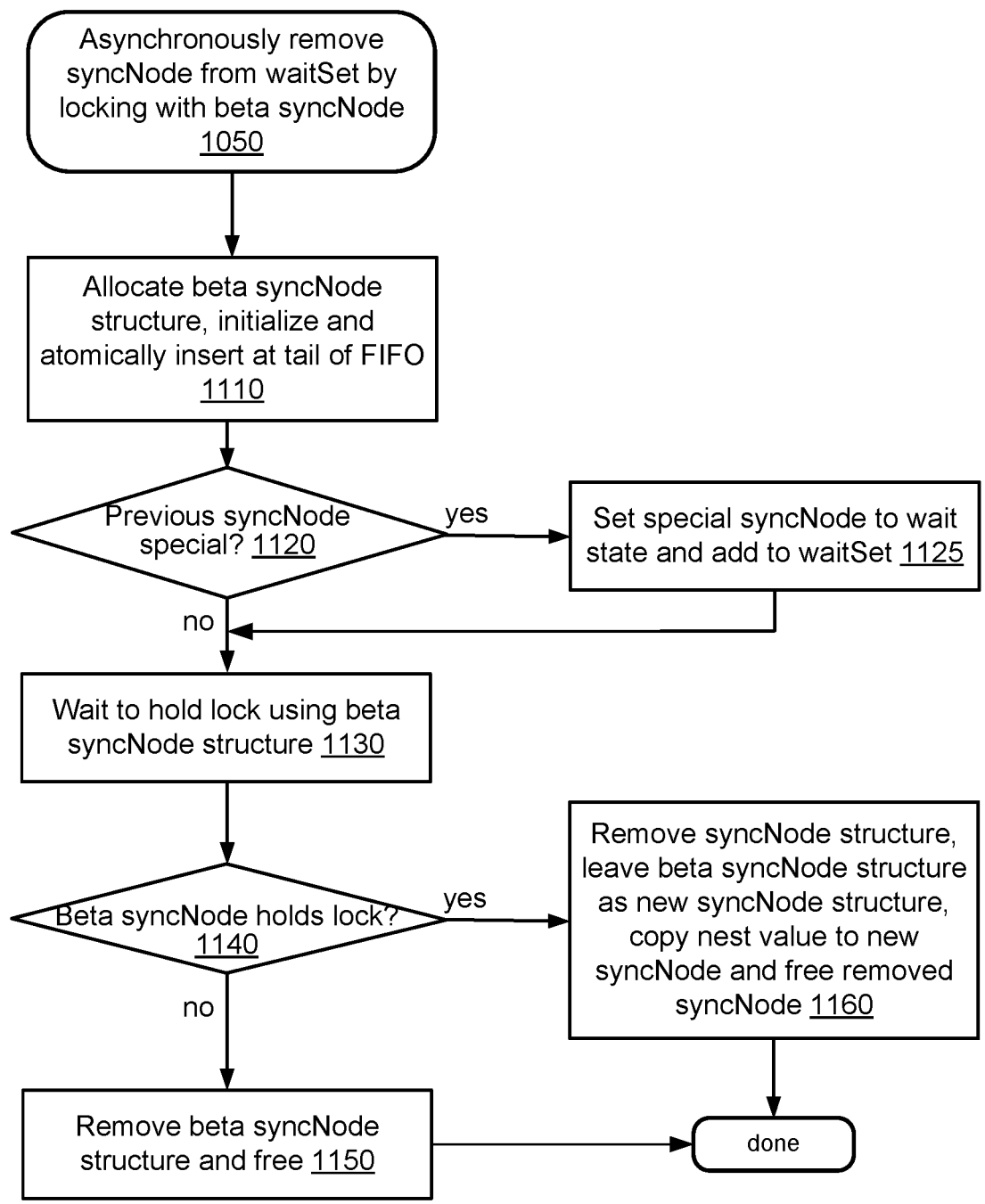
FIG. 11 is a flow diagram illustrating an embodiment of removing a thread from a waitSet of an object resulting from abnormal termination of the wait.

FIG. 11 is a flow diagram illustrating some embodiments of removing a thread from a waitSet of an object resulting from abnormal termination of the wait. In various embodiments, a thread wait operation may terminate abnormally for a number of reasons including, for example, receiving an interrupt, an exception or a wait timeout. Other causes of abnormal termination may also exist and it should be understood that the examples provided above are not intended to be limiting.

When a thread wait is terminated normally, the thread may resume holding the object's lock. As such, the thread may manipulate the synchronization data structure as appropriate. If, however, the wait is terminated abnormally, the thread may not hold the object's lock and must therefore obtain the lock before changes to the synchronization structure may occur. Therefore, the method begins at step 1110 with the thread first submitting a syncNode structure to obtain the object's lock.

As the thread's existing syncNode for the object may currently be in the waitSet of the object, and need to be removed from the waitSet, an additional syncNode, known as a beta syncNode, may first be allocated and enqueued to obtain hold of the lock. As shown in 1110, the thread may obtain a free syncNode structure to obtain a hold on the object lock. In some embodiments, the thread may obtain the free syncNode from a stack of free nodes pointed to by the free field 510 of the thread control structure 500 as shown in FIG. 5. If no free syncNode structures exist, syncNode structures may be allocated in memory and added to the free list or allocated directly by the thread. In other embodiments, other allocation schemes may be employed and it should be understood that the allocation methods described above are not intended to be limiting.

The method then proceeds to step 1120 where the tail pointer of the FIFO list, stored in the multi-function word 220 of the object 200 as shown in FIG. 2, is first checked. If the previous tail pointer identifies a syncNode in a special state, that syncNode may be set to a wait state in some embodiments and added to the waitSet, as shown in 1125. The method then advances to step 1130. If the previous tail pointer does not identify a syncNode in a special state, the method advances to step 1130.

In step 1130, the thread then waits to hold the lock of the object. As the thread has the original syncNode in the waitSet and the beta syncNode waiting to hold the lock, the thread may wake if either syncNode is set to a locked state.

Once the thread wakes and holds the lock, the method advances to step 1140 where the syncNode indicated in the locked state is determined. If the beta syncNode indicates a locked state, the method proceeds to step 1160, where the original syncNode structure may be removed from the waitSet, in some embodiments. The beta syncNode may then assume the role of the syncNode for the thread by copying the nest value from the removed syncNode. The removed syncNode may then be freed and the method is complete.

If, however, the beta syncNode is not indicated a locked state, the method proceeds to step 1150 where the beta syncNode is removed from the FIFO list of the synchronization structure and freed. The method is then complete.

Figure 12:
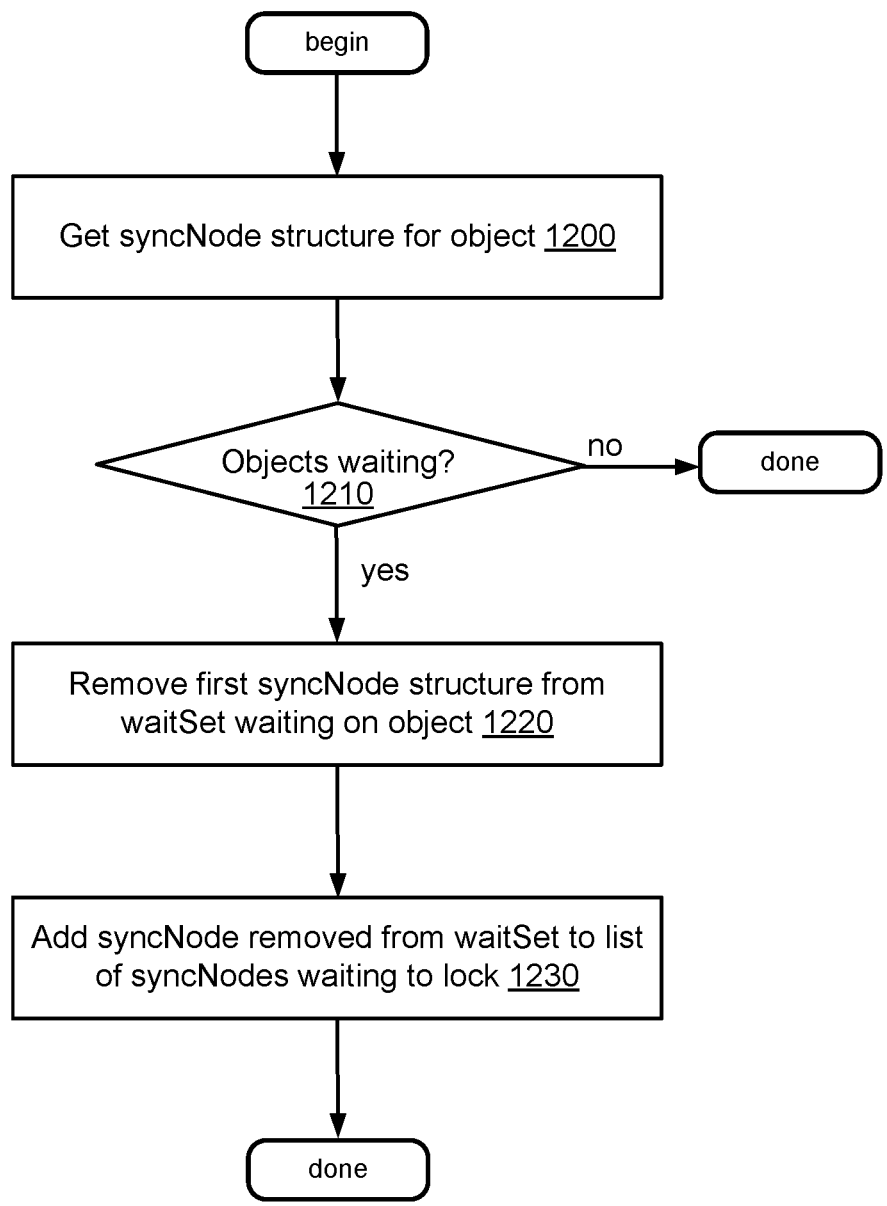
FIG. 12 is a flow diagram illustrating an embodiment of a method for notifying a thread waiting on an event related to an object.

FIG. 12 is a flow diagram illustrating some embodiments of a method for notifying a thread waiting on an event related to an object. The method begins at step 1200 by obtaining, by a thread holding the lock, its associated syncNode structure for the object using the inUse field 520 of the thread control structure 500 as shown in FIG. 5. As shown in 1210, if no syncNode structure exists on the stack as identified using the waitSet field 630 of the syncNode structure as shown in FIG. 6, the method is complete as no threads are waiting for events associated with the object. Otherwise, the method may proceed in some embodiments to step 1220.

In step 1220, the notifying thread may remove the first waiting syncNode structure from the stack and proceed to step 1230 where the removed syncNode is added to the FIFO list of syncNodes waiting to hold the lock of the object, in some embodiments. Once the syncNode is added, the notify process is complete.

Figure 13:
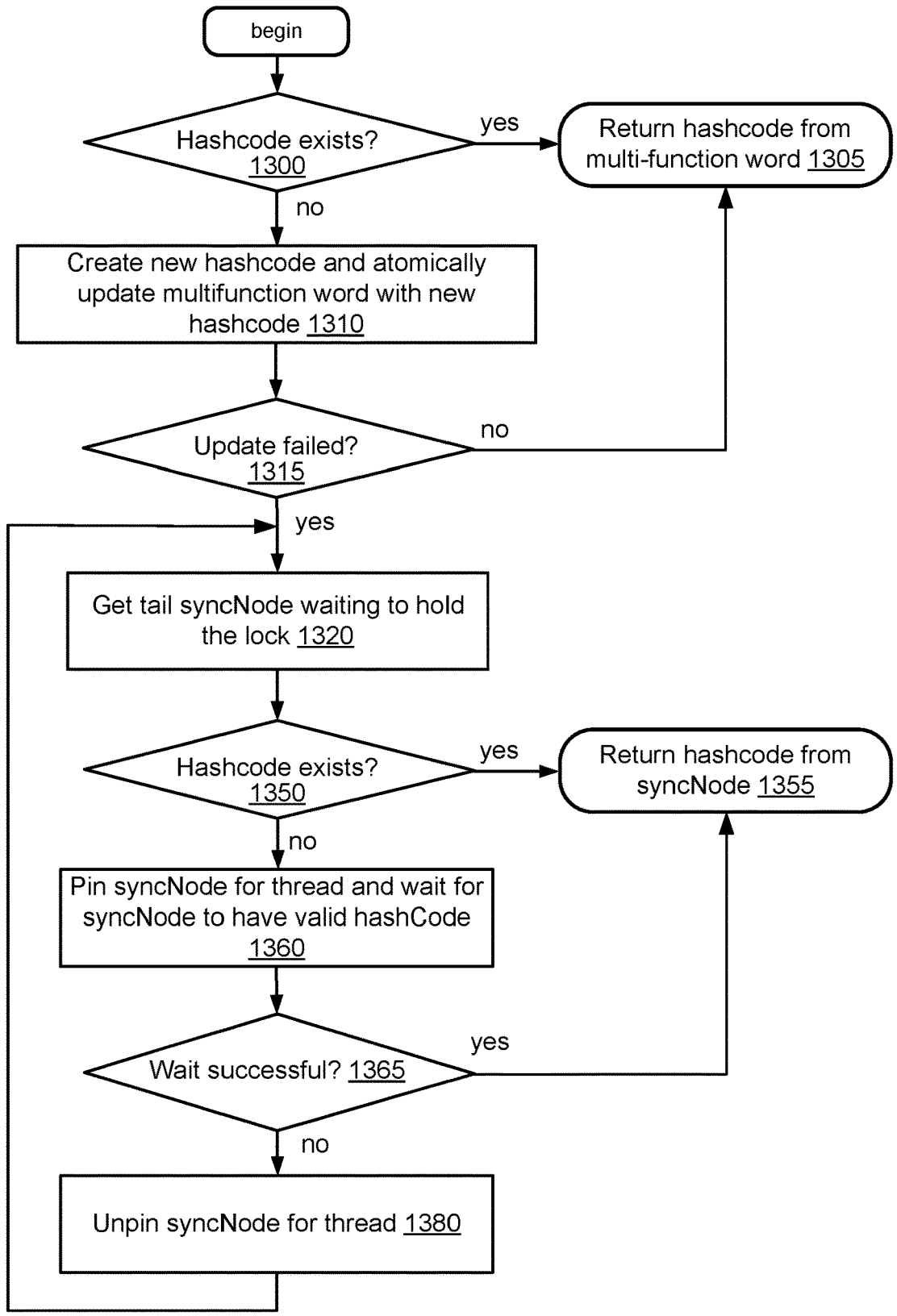
FIG. 13 is a flow diagram illustrating an embodiment of a method for reading a hashcode for an object.

FIG. 13 is a flow diagram illustrating some embodiments of a method for reading a hashcode for an object. In managed runtimes, a hashcode may be used as an identifier of an object, and once a hashcode for an object is assigned, the hashcode may be immutable. To install a synchronization structure using the multi-function word of an object, an existing hashcode for the object must be displaced and maintained within the installed synchronization structure and a method for accessing the displaced hashcode may be provided. After the installed synchronization structure is no longer needed, the displaced hashcode may be restored to the multi-function word of the object.

The method begins at step 1300 where the multi-function word is first checked to see if the multi-function word stores a hashcode, for example by checking if the multi-function identifier 310 indicates a hashed state 420 as shown in FIGS. 2 and 3. If the multi-function word contains a hashcode, the method proceeds to step 1305 where the hashcode in the multi-function word may be returned in some embodiments. The method is then complete.

If the multi-function word does not contain a hashcode, the method proceeds to step 1310 where a new hashcode for the object may be created and atomically written to the multi-function word, for example using a CAS instruction, in some embodiments. If the atomic update succeeds as determined in step 1315, the method proceeds to step 1305 where the hashcode in the multi-function word may be returned in some embodiments. The method is then complete.

If the atomic update fails due to the existence of a synchronization structure, the method proceeds to step 1320. A last syncNode waiting to hold the lock may be identified from the tail of the FIFO list stored in the multi-function word of the object in some embodiments. If this syncNode contains a hashcode, for example in the DMW 640 of the syncNode structure 600 as shown in FIG. 6, then the method proceeds to step 1355 where the hashcode in the syncNode may be returned in some embodiments. The method is then complete.

If the syncNode does not contain the hashcode, the method proceeds to step 1360 where the method may first pin the syncNode to prevent the syncNode from being freed. The method may then wait for the syncNode to have a hashcode in some embodiments. If the wait fails due to a new syncNode being added to the tail of the FIFO list, the method proceeds to step 1380 where the syncNode is unpinned and the method returns to step 1320. If the wait, however, is successful and the syncNode has a hashcode, the method proceeds to step 1355 where the hashcode in the syncNode may be returned in some embodiments. The method is then complete.

Some of the mechanisms described herein may be provided as a computer program product, or software, that may include a non-transitory, computer-readable storage medium having stored thereon instructions which may be used to program a computer system 1400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Figure 14:
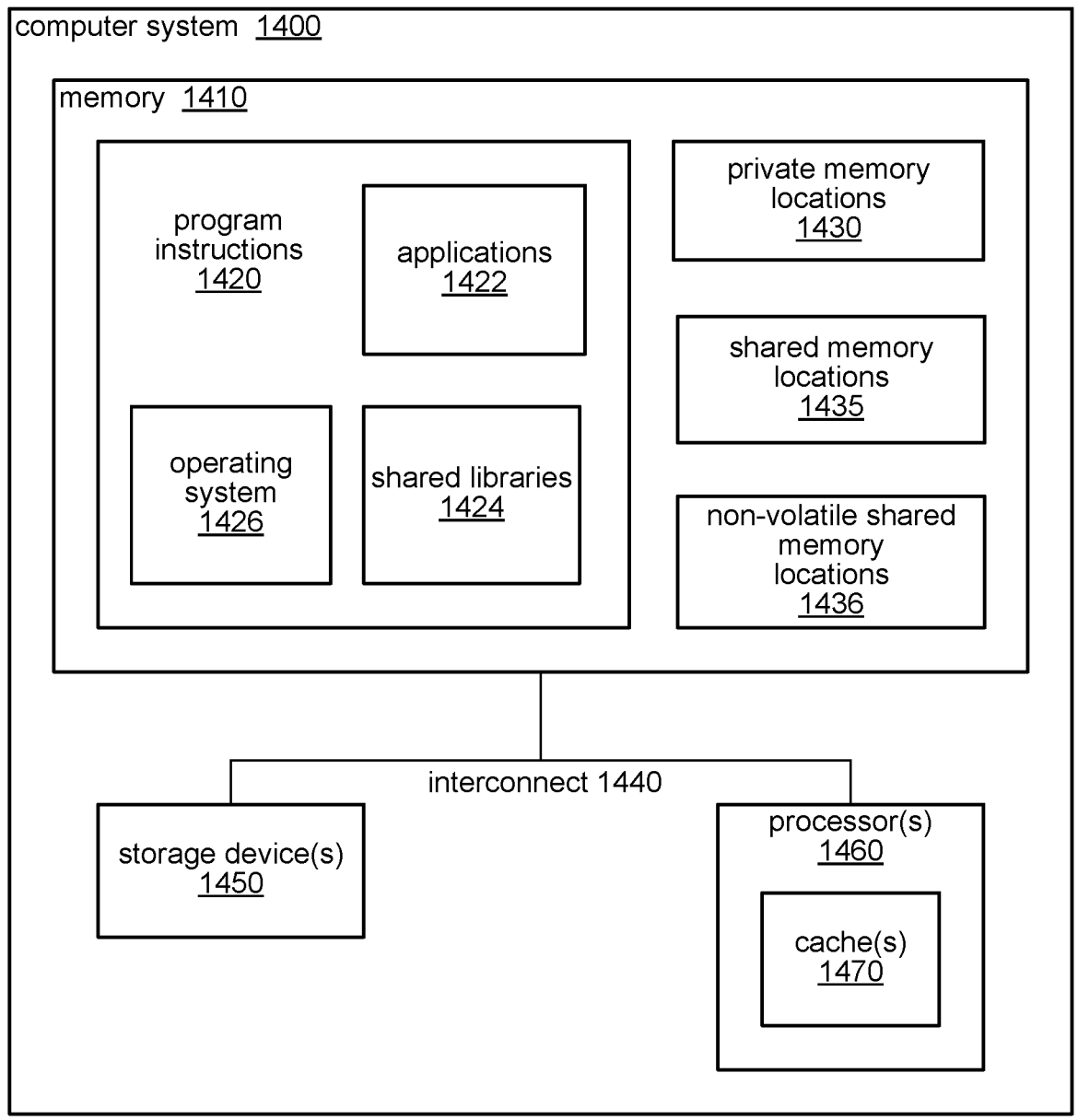
FIG. 14 is a block diagram illustrating an embodiment of a computing system that is configured to implement NUMA-aware lock operations, as described herein.

In various embodiments, computer system 1400 may include one or more processors 1460; each may include multiple cores, any of which may be single- or multi-threaded. For example, multiple processor cores may be included in a single processor chip (e.g., a single processor 1460), and multiple processor chips may be included in computer system 1400. Each of the processors 1460 may include a cache or a hierarchy of caches 1470, in various embodiments. For example, each processor chip 1460 may include multiple L1 caches (e.g., one per processor core) and one or more other caches (which may be shared by the processor cores on a single processor). The computer system 1400 may also include one or more storage devices 1450 (e.g. optical storage, magnetic storage, hard drive, tape drive, solid state memory, etc.) and one or more system memories 1410 (e.g., one or more of cache, SRAM, DRAM, RDRAM, EDO RAM, DDR RAM, SDRAM, Rambus RAM, EEPROM, etc.). In some embodiments, one or more of the storage device(s) 450 may be implemented as a module on a memory bus (e.g., on interconnect 1440) that is similar in form and/or function to a single in-line memory module (SIMM) or to a dual in-line memory module (DIMM). Various embodiments may include fewer or additional components not illustrated in FIG. 14 (e.g., video cards, audio cards, additional network interfaces, peripheral devices, a network interface such as an ATM interface, an Ethernet interface, a Frame Relay interface, etc.)

The one or more processors 1460, the storage device(s) 1450, and the system memory 1410 may be coupled to the system interconnect 1440. One or more of the system memories 1410 may contain application data 1428 and program instructions 1420. Application data 1428 may contain various data structures to implement enhanced ticket locks while Program instructions 1420 may be executable to implement one or more applications 1422, shared libraries 1424, and/or operating systems 1426.

Program instructions 1420 may be encoded in platform native binary, any interpreted language such as Java' bytecode, or in any other language such as C/C++, the Java™ programming language, etc., or in any combination thereof. In various embodiments, applications 1422, operating system 1426, and/or shared libraries 1424 may each be implemented in any of various programming languages or methods. For example, in one embodiment, operating system 1426 may be based on the Java programming language, while in other embodiments it may be written using the C or C++ programming languages. Similarly, applications 1422 may be written using the Java programming language, C, C++, or another programming language, according to various embodiments. Moreover, in some embodiments, applications 1422, operating system 1426, and/shared libraries 1424 may not be implemented using the same programming language. For example, applications 1422 may be C++ based, while shared libraries 1424 may be developed using C.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein. It is intended that the following claims be interpreted to embrace all such variations and modifications.

In conclusion, embodiments of a compact synchronization APIs are disclosed. These embodiments require only a single word of existing, repurposed memory per object and are therefore useful to provide synchronization semantics in applications that are sensitive to memory growth. While similar to existing locking approaches such as the MCS lock and possessing similar benefits, these synchronization embodiments additionally provide wait and notification semantics as well as low-latency, scalable inflation and deflation methods for mitigating memory and performance impact while supporting displacement of the memory contents of the displaced memory field. This enables high performance and zero memory growth in non-contested use, with minimal memory growth and latency in contested use while providing efficient restoration of object memory after lock contention ends.

What is claimed:

1. A computer-implemented method, comprising:
   receiving a request to hold a lock for an object, the object comprising a memory location and the request comprising an address of a synchronization structure; and
   responsive to receiving the request:
      atomically exchanging a value stored in the memory location with the address of the synchronization structure;
      responsive to determining that the value is an identifier of the object, recording the identifier of the object in the synchronization structure;
      responsive to determining that the value is an address of another synchronization structure waiting to hold the lock, waiting for transfer of the lock, the waiting for transfer of the lock comprising:
         obtaining the identifier of the object from the other synchronization structure;
         recording the obtained identifier of the object in the synchronization structure;
         recording the address of the synchronization structure in the other synchronization structure; and
         waiting for hold of the lock to be transferred to the synchronization structure; and
      returning an indicator of a held state for the requested lock.

2. The method of claim 1, further comprising:
   responsive to determining that the value is undefined:
      creating the identifier for the object; and
      recording the created identifier of the object in the synchronization structure.

3. The method of claim 1, the waiting for transfer of the lock further comprising:
   copying a list of one or more synchronization structures currently waiting for respective events associated with the object from the other synchronization structure to the synchronization structure.

4. The method of claim 1, further comprising:
responsive to determining that the value is an address of a third synchronization structure waiting for an event associated with the lock:
   copying a list of one or more synchronization structures currently waiting for respective events associated with the object from the third synchronization structure to the synchronization structure; and
   adding the third synchronization structure to the copied list of one or more synchronization structures.

5. The method of claim 1, further comprising:
responsive to receiving a request to release the hold of the lock:
   reading a current value of the memory location; and
   responsive to determining that no synchronization structures are waiting to hold the lock, writing the identifier stored in the synchronization structure to the memory location.

6. The method of claim 1, further comprising:
receiving another request to wait for an event associated with the object, the other request comprising an address of a third synchronization structure; and
responsive to receiving the other request:
   reading a current value of the memory location; and
   responsive to determining that the current value is an address of a fourth synchronization structure waiting to hold the lock:
      copying a list of one or more synchronization structures currently waiting for respective events associated with the object from the third synchronization structure to the fourth synchronization structure;
      adding the third synchronization structure to the copied list; and
      writing an indicator of a locked state to the fourth synchronization structure.

7. The method of claim 1, further comprising:
responsive to receiving a request to notify of an event associated with the object:
   removing a third synchronization structure from the list of one or more synchronization structures; and
   submitting a request to hold the lock for the object using the third synchronization structure.

8. One or more non-transitory computer-accessible storage media storing program instructions that when executed on or across one or more computing devices cause the one or more computing devices to perform:
receiving a request to hold a lock for an object, the object comprising a memory location and the request comprising an address of a synchronization structure; and
responsive to receiving the request:
   atomically exchanging a value stored in the memory location with the address of the synchronization structure;
   responsive to determining that the value is an identifier of the object, recording the identifier of the object in the synchronization structure;
   responsive to determining that the value is an address of another synchronization structure waiting to hold the lock, waiting for transfer of the lock, the waiting for transfer of the lock comprising:
      obtaining the identifier of the object from the other synchronization structure;
      recording the obtained identifier of the object in the synchronization structure;
      recording the address of the synchronization structure in the other synchronization structure; and
      waiting for hold of the lock to be transferred to the synchronization structure; and
   returning an indicator of a held state for the requested lock.

9. The one or more non-transitory computer-accessible storage media of claim 8, storing further instructions that when executed on or across the one or more computing devices cause the one or more computing devices to further perform:
responsive to determining that the value is undefined:
   creating the identifier for the object; and
   recording the created identifier of the object in the synchronization structure.

10. The one or more non-transitory computer-accessible storage media of claim 8, the waiting for transfer of the lock further comprising:
copying a list of one or more synchronization structures currently waiting for respective events associated with the object from the other synchronization structure to the synchronization structure.

11. The one or more non-transitory computer-accessible storage media of claim 8, further comprising:
responsive to determining that the value is an address of a third synchronization structure waiting for an event associated with the lock:
   copying a list of one or more synchronization structures currently waiting for respective events associated with the object from the third synchronization structure to the synchronization structure; and
   adding the third synchronization structure to the copied list of one or more synchronization structures.

12. The one or more non-transitory computer-accessible storage media of claim 8, storing further instructions that when executed on or across the one or more computing devices cause the one or more computing devices to further perform:
responsive to receiving a request to release the hold of the lock:
   reading a current value of the memory location; and
   responsive to determining that no synchronization structures are waiting to hold the lock, writing the identifier stored in the synchronization structure to the memory location.

13. The one or more non-transitory computer-accessible storage media of claim 8, storing further instructions that when executed on or across the one or more computing devices cause the one or more computing devices to further perform:
receiving another request to wait for an event associated with the object, the other request comprising an address of a third synchronization structure; and
responsive to receiving the other request:
   reading a current value of the memory location; and
   responsive to determining that the current value is an address of a fourth synchronization structure waiting to hold the lock:
      copying a list of one or more synchronization structures currently waiting for respective events associated with the object from the third synchronization structure to the fourth synchronization structure;
      adding the third synchronization structure to the copied list; and
      writing an indicator of a locked state to the fourth synchronization structure.

14. The one or more non-transitory computer-accessible storage media of claim 8, storing further instructions that when executed on or across the one or more computing devices cause the one or more computing devices to further perform:
responsive to receiving a request to notify of an event associated with the object:
removing a third synchronization structure from the list of one or more synchronization structures; and
submitting a request to hold the lock for the object using the third synchronization structure.

15. A system, comprising:
at least one processor; and
a memory, storing program instructions that when executed by the at least one processor cause the at least one processor to implement a synchronization manager, the synchronization manager configured to:
receive a request to hold a lock for an object, the object comprising a memory location and the request comprising an address of a synchronization structure; and
responsive to receiving the request:
atomically exchange a value stored in the memory location with the address of the synchronization structure;
responsive to determining that the value is an identifier of the object, record the identifier of the object in the synchronization structure;
responsive to determining that the value is an address of another synchronization structure waiting to hold the lock, wait for transfer of the lock, wherein to wait for the transfer of the lock, the synchronization manager is configured to:
obtain the identifier of the object from the other synchronization structure;
record the obtained identifier of the object in the synchronization structure;
record the address of the synchronization structure in the other synchronization structure; and
wait for hold of the lock to be transferred to the synchronization structure; and
return an indicator of a held state for the requested lock.

16. The system of claim 15, the synchronization manager further configured to:
responsive to determining that the value is undefined:
create the identifier for the object; and
record the created identifier of the object in the synchronization structure.

17. The system of claim 15, wherein to wait for the transfer of the lock the synchronization manager is configured to:
copy a list of one or more synchronization structures currently waiting for respective events associated with the object from the other synchronization structure to the synchronization structure.

18. The system of claim 15, the synchronization manager further configured to:
responsive to determining that the value is an address of a third synchronization structure waiting for an event associated with the lock:
copy a list of one or more synchronization structures currently waiting for respective events associated with the object from the third synchronization structure to the synchronization structure; and
add the third synchronization structure to the copied list of one or more synchronization structures.

19. The system of claim 15, the synchronization manager further configured to:
responsive to receiving a request to release the hold of the lock:
read a current value of the memory location; and
responsive to determining that no synchronization structures are waiting to hold the lock, write the identifier stored in the synchronization structure to the memory location.

20. The system of claim 15, the synchronization manager further configured to:
responsive to receiving a request to notify of an event associated with the object:
remove a third synchronization structure from the list of one or more synchronization structures; and
submit a request to hold the lock for the object using the third synchronization structure.

* * * * *

UNITED STATES PATENT AND TRADEMARK OFFICE
CERTIFICATE OF CORRECTION

PATENT NO. : 12,045,670 B2
APPLICATION NO. : 17/245820
DATED : July 23, 2024
INVENTOR(S) : Dice et al.

It is certified that error appears in the above-identified patent and that said Letters Patent is hereby corrected as shown below:

In the Drawings

On sheet 1 of 10, in FIG. 1, and on the Title Page, the illustrative print figure, under reference numeral 132, Line 1, delete "syncronization" and insert -- synchronization --, therefor.

On sheet 1 of 10, in FIG. 1, and on the Title Page, the illustrative print figure, under reference numeral 135, Line 1, delete "Syncronization" and insert -- Synchronization --, therefor.

In the Specification

In Column 11, Line 48, delete "Java'" and insert -- Java™ --, therefor.

Signed and Sealed this
Tenth Day of December, 2024

Katherine Kelly Vidal
*Director of the United States Patent and Trademark Office*